(12) United States Patent
MacAdams et al.

(10) Patent No.: US 9,789,646 B2
(45) Date of Patent: *Oct. 17, 2017

(54) BONDING OF COMPOSITE MATERIALS

(71) Applicant: Cytec Industries Inc., Woodland Park, NJ (US)

(72) Inventors: Leonard MacAdams, Woolwich Township, NJ (US); Dalip Kohli, Churchville, MD (US)

(73) Assignee: Cytec Industries Inc., Woodland Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,972

(22) Filed: Oct. 27, 2015

(65) Prior Publication Data

US 2016/0121591 A1     May 5, 2016

Related U.S. Application Data

(60) Provisional application No. 62/074,266, filed on Nov. 3, 2014.

(51) Int. Cl.
*B29C 65/00* (2006.01)
*B32B 37/12* (2006.01)
(Continued)

(52) U.S. Cl.
CPC .......... *B29C 66/0224* (2013.01); *B05D 3/007* (2013.01); *B32B 37/12* (2013.01);
(Continued)

(58) Field of Classification Search
CPC .............. B29C 66/0224; B29C 66/712; B29C 66/73753; B32B 37/0038; B32B 37/025;
(Continued)

(56) References Cited

U.S. PATENT DOCUMENTS 4,004,061 A * 1/1977 Creighton .................. C09J 7/00
156/283
4,307,212 A 12/1981 Start, Jr.
(Continued)

FOREIGN PATENT DOCUMENTS

EP      2103416 A2    9/2009
GB      2409837 A     7/2009
(Continued)

OTHER PUBLICATIONS

Machine translation of JP 61252284 date unknown.*

*Primary Examiner* — John Goff
(74) *Attorney, Agent, or Firm* — Thi Dang

(57) ABSTRACT

A method for surface preparation of composite substrates prior to adhesive bonding. A curable surface treatment layer is applied onto a curable, resin-based composite substrate, followed by co-curing. After co-curing, the composite substrate is fully cured but the surface treatment layer remains partially cured. The surface treatment layer may be a resin film or a removal peel ply composed of resin-impregnated fabric. After surface preparation, the composite substrate is provided with a chemically-active, bondable surface that can be adhesively bonded to another composite substrate to form a covalently-bonded structure.

21 Claims, 3 Drawing Sheets

(51) Int. Cl.
*B05D 3/00* (2006.01)
*B32B 37/14* (2006.01)
*C08J 5/24* (2006.01)
*C09J 5/02* (2006.01)

(52) U.S. Cl.
CPC ............... *B32B 37/14* (2013.01); *C08J 5/24* (2013.01); *C09J 5/02* (2013.01); *B32B 2260/046* (2013.01); *B32B 2305/72* (2013.01); *C08J 2363/00* (2013.01); *C08J 2463/00* (2013.01); *C09J 2463/00* (2013.01); *C09J 2463/006* (2013.01); *C09J 2463/008* (2013.01)

(58) Field of Classification Search
CPC .......... B32B 37/144; B32B 38/10; C08J 5/24; B05D 3/007
USPC ....... 156/152, 182, 230, 231, 238, 241, 247, 156/249, 307.1–307.7, 714; 427/207.1, 427/208.2
See application file for complete search history.

(56) References Cited

U.S. PATENT DOCUMENTS

| | | | | |
|---|---|---|---|---|
| 4,663,401 | A | * 5/1987 | Saito | ............... C08G 59/50 525/505 |
| 6,740,399 | B1 | * 5/2004 | George | ............... B32B 7/12 428/314.4 |
| 6,793,763 | B1 | 9/2004 | Leach | |
| 2001/0053817 | A1 | * 12/2001 | Anayama | ............... C08G 59/50 525/107 |
| 2003/0220455 | A1 | 11/2003 | Ichiroku et al. | |
| 2010/0047560 | A1 | * 2/2010 | Salnikov | ............... C08J 7/047 428/327 |
| 2012/0010329 | A1 | * 1/2012 | Hunter | ............... C08G 59/226 523/457 |
| 2013/0129957 | A1 | 5/2013 | Zhao et al. | |
| 2013/0280488 | A1 | 10/2013 | Flinn | |
| 2014/0144568 | A1 | 5/2014 | MacAdams | |

FOREIGN PATENT DOCUMENTS

| | | | |
|---|---|---|---|
| JP | 61252284 A | * | 11/1986 |
| WO | 2013101354 A1 | | 7/2013 |
| WO | 2015026441 A1 | | 2/2015 |

\* cited by examiner

BONDING OF COMPOSITE MATERIALS

This application claims the benefit of U.S. Provisional Patent Application No. 62/074,266, filed Nov. 3, 2014, the disclosure of which is incorporated by reference in its entirety.

DETAILED DESCRIPTION

Figure 1A:
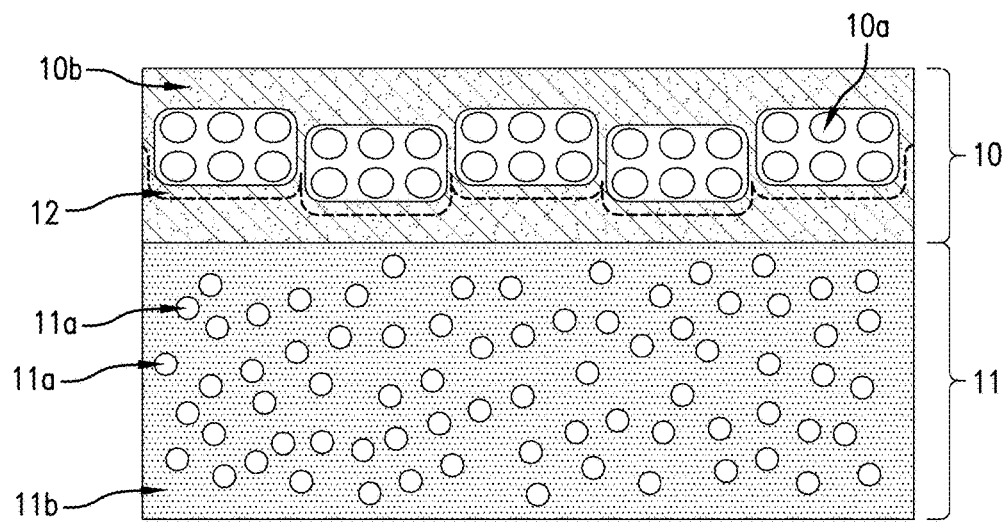
FIGS. 1A-1B illustrate a method of preparing a bondable surface on a composite substrate using a peel ply, according to one embodiment of the present disclosure.

Adhesive bonding has been conventionally used as a method for joining composite structures, such as those used in the aerospace industry. Currently, adhesive bonding of composite structures is carried out predominantly by one of three ways: (1) co-curing, (2) co-bonding, and (3) secondary bonding.

"Co-curing" involves joining uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials are difficult to handle. For example, it is difficult to assemble and bond uncured composite materials on tools with complex three-dimensional shapes.

"Co-bonding" involves joining a pre-cured composite part to an uncured composite part by adhesive bonding, wherein the adhesive and the uncured composite part are being cured during bonding. The pre-cured composite usually requires an additional surface preparation step prior to adhesive bonding.

"Secondary bonding" is the joining together of pre-cured composite parts by adhesive bonding, wherein only the adhesive is being cured. This bonding method typically requires surface preparation of each previously cured composite part at the bonding surfaces.

Proper surface treatment for co-bonding and secondary bonding is a prerequisite to achieve the highest level of bond line integrity in adhesively bonded structures. Bond line integrity, generally, refers to the overall quality and robustness of the bonded interface. Conventional co-bonding and secondary bonding processes typically include a surface treatment of the composite structures pursuant to the manufacturer's specifications prior to adhesive bonding. Surface treatments include, but are not limited to grit blasting, sanding, peel ply, priming, etc. These surface treatment methods improve adhesion predominantly by mechanical roughening of the surface. The roughened surface allows for better adhesion due to mechanical interlocking at the bonding interface. Such co-bonding or secondary bonding of pre-cured composite structures has a limitation in that the bonding mechanism occurs only through mechanical interlocking with no formation of chemical bonds as in co-cure bonding. Such surface treatments, if performed improperly, could become a source of bond failure during the use of the final bonded structure. Furthermore, in the absence of chemical bond formation at the interface of a composite bonded assembly, the assessment of bond line quality is critical to ensure that proper bonding has occurred. Unfortunately, assessment of bond line quality is often difficult and current techniques known in the art to measure bond line quality are not well suited to measure and evaluate all potential sources of weak bonds.

In the aerospace industry, adhesives are typically used in combination with mechanical fasteners (e.g. rivets, screws, and bolts) to safely and reliably secure structural materials. Rarely are structural adhesives used as the sole mechanism for joining structural parts in an aircraft. Some of the benefits provided by adhesively bonded parts include lighter weight, reduced stress concentrations, durability, lower part count, etc. Despite these benefits, the use of adhesive bonding is limited due, in part, to the difficulty in assessing bond line integrity. Currently, a non-destructive method is not known to exist for measuring the bond strength of joined parts. The only way to measure the strength of an adhesively bonded joint is to find the ultimate strength, which is obtained by breaking the bond. For obvious reasons, this type of destructive testing is not practical in an industrial manufacturing environment such as the assembly of an aircraft. Moreover, proof testing a large number of specimens to determine the average load capacity of an adhesive does not guarantee that each and every bonded structure will have the expected bond strength.

In order to meet certain aviation certification requirements in countries such as the United States, structural redundancy of primary structures is currently required. Current state-of-the-art bonding methods are not able to satisfy those requirements. Currently, only co-cured structures are certified by the Federal Aviation Administration (FAA) in the United States for primary structures and are used extensively in the aerospace industry. Thus, there remains a need for an adhesive bonding method or technology that can be used in a manufacturing environment as a method of creating reliable and high-strength chemical bonds while providing excellent reproducibility of bond line quality. Furthermore, there remains a need for a bonding method that could satisfy the structural redundancy requirements (e.g. those set out by the FAA in the United States) without adding extra manufacturing steps.

A surface preparation method is disclosed herein that enables the creation of a chemically-active composite surface, which is chemically bondable to another substrate via the use of a resin-based adhesive. This bonding method creates a chemical bond between the composite surface and the adhesive, resulting in a stronger bond between substrates. Furthermore, this bonding process minimizes the effect of contamination on the bonding surfaces of the composite substrates. In addition, this bonding method can be practiced on an industrial scale and does not require substantial change to the infrastructure currently being used in the industry.

The bonding method disclosed herein allows for a way of achieving a certifiable bonding method by creating chemically reactive functional groups at the surface to be bonded, resulting in a co-cured structure. Consequently, the novel bonding method disclosed herein provides a way of satisfying structural redundancy requirements such as those set out by the FAA in the United States without adding extra manufacturing steps.

Figure 1B:
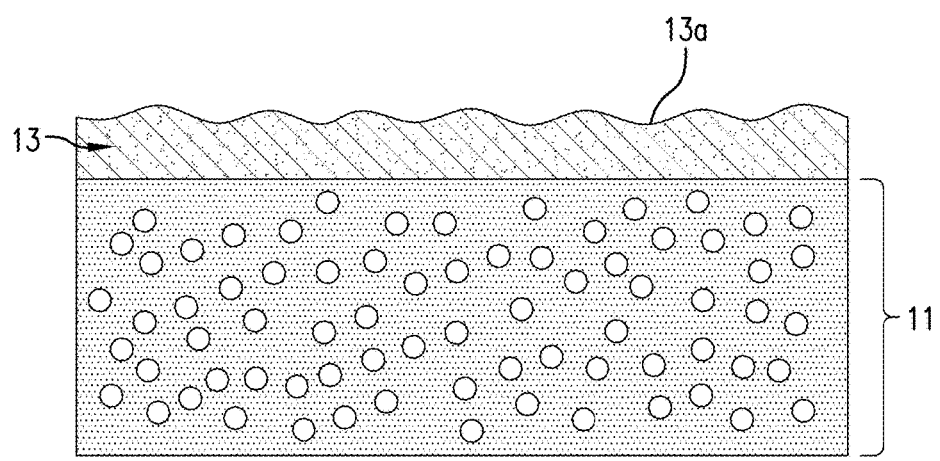

The aforementioned chemically active composite surface is created by using a curable surface treatment layer that can be placed on a fiber-reinforced resin substrate (or "composite substrate"). In one embodiment, the curable surface treatment layer is a resin-rich peel ply. FIGS. 1A-1B illustrate how a resin-rich peel ply is used to create a bondable surface with chemically-active functional groups. Referring to FIG. 1A, a curable peel ply 10 is first laminated onto an outermost surface of an uncured or curable composite substrate 11. The uncured/curable composite substrate is composed of reinforcement fibers 11a infused or impregnated with an uncured or curable matrix resin 11b, which contain one or more thermoset resins. As an example, the reinforcement fibers 11a may be continuous unidirectional carbon fibers. The curable peel ply 10 is composed of a woven fabric 10a infused or impregnated with a curable matrix resin 10b that is different from the uncured/curable matrix resin 11b of the composite substrate 11. The matrix resin of the peel ply 10 also contains one or more thermoset resins; however, it is formulated so that the peel ply's resin cures more slowly than the resin of the composite substrate 11. As a result, the peel ply's resin is only partially cured when the composite substrate 11 is fully cured under the same curing conditions. Next, co-curing of the peel ply 10 and the composite substrate 11 is carried out by heating at elevated temperature(s) for a pre-determined time period until the composite substrate 11 is fully cured, but the peel ply 10 is only partially cured. As a result of co-curing, the peel ply's matrix resin intermingles and reacts with the composite matrix resin at the interfacial region. The cure kinetics of the peel ply resin and of the substrate's matrix resin are controlled to obtain the desired amount of intermingling between the peel ply resin matrix. After co-curing, the peel ply (including the fabric therein) is peeled off at the fracture line 12 shown in FIG. 1A, leaving behind a remaining thin film of partially-cured resin 13 on the composite substrate 11 as shown in FIG. 1B. The fracture line 12 during peeling is at the fiber-resin interface, but not within the fabric. As a result, a rough, bondable surface 13a with chemically-active functional groups is formed (FIG. 1B).

Figure 2:
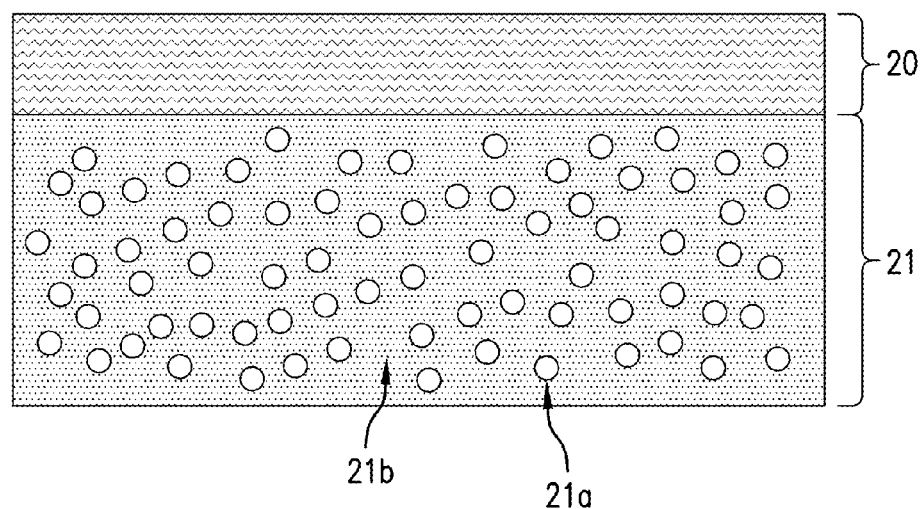
FIG. 2 schematically illustrates a composite substrate having a surface resin film formed thereon according to another embodiment of the present disclosure.

In another embodiment, the curable surface treatment layer is a curable resin film 20 (without any fabric embedded therein) as shown in FIG. 2. In this embodiment, the curable resin film 20 is formed on a composite substrate 21, which is composed of reinforcement fibers 21a infused or impregnated with an uncured or curable matrix resin 21b, and the resulting structure is co-cured. As an example, the reinforcement fibers 11a may be continuous unidirectional carbon fibers. As in the case of the peel ply, the surface resin film is formulated so that it cures more slowly than the resin of the composite substrate. As a result, when the composite substrate is fully cured, the surface resin film is only partially cured and the cured composite substrate is provided with a bondable surface having chemically-active functional groups.

In the above embodiments, co-curing of the surface treatment layer (peel ply/resin film) and composite substrate may be carried out at a temperature ranging from about room temperature (20° C.-25° C.) to about 375° F. (191° C.) for about 1 h to about 12 h at pressures ranging from about 0 psi to about 80 psi (or about 0 MPa to about 0.55 MPa). Moreover, co-curing may be achieved in an autoclave or by an out-of-autoclave process in which no external pressure is applied.

Figure 3:
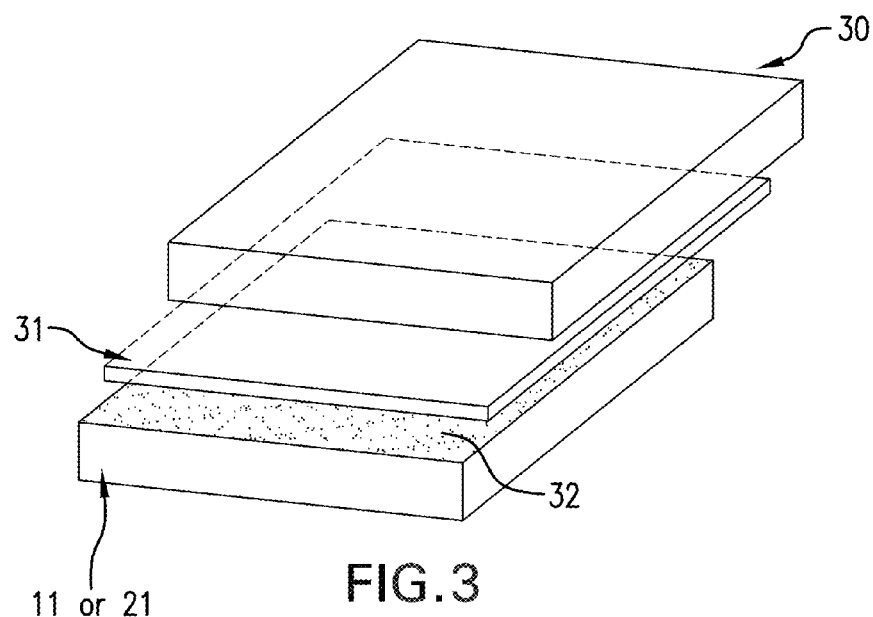
FIG. 3 illustrates adhesive bonding of two composite substrates after surface treatment.

The first cured composite substrate 11 or 21 with the bondable surface, as discussed above, may be joined to a second composite substrate 30 with a curable, resin-based adhesive film 31 sandwiched in between the substrates and in contact with the bondable surface 32 as shown in FIG. 3. The resin-based adhesive film 31 is in an uncured or partially cured state and possesses chemical functional groups that are capable of reacting with the chemically-active functional groups on the bondable surface 32 of the first substrate (11 or 21). During a subsequent heat treatment to affect bonding, these functional groups react with each other to form chemical or covalent bonds.

The second composite substrate 30 may be a cured composite substrate that has been subjected to the same peel ply surface preparation as described for the first composite substrate (11 or 21) so as to form a counterpart bondable surface with chemically-active functional groups. The joined composite substrates are then subjected to heat treatment at elevated temperature(s) to cure the adhesive, resulting in a covalently bonded structure—this is referred to as secondary bonding. The adhesive film 31 may be applied to either or both of the bondable surfaces of the first and second composite substrates.

Alternatively, the bondable surface of the second composite substrate 30 may be prepared by other known surface treatments such as sand blasting, grit blasting, dry peel ply surface preparation, etc. "Dry peel ply" is a dry, woven fabric (without resin), usually made out of nylon, glass, or polyester, which is applied to the bonding surface of the composite substrate followed by curing. After curing, the dry peel ply is removed to reveal a textured bonding surface.

In an alternative embodiment, the second composite substrate 30 is in an uncured state when it is joined to the first cured composite substrate (11 or 21). In such case, the uncured composite substrate 30 and the curable adhesive film 31 are cured simultaneously in a subsequent heating step—this is referred to as co-bonding.

During co-bonding or secondary bonding of the composite substrates according to the methods disclosed herein, chemical or covalent bonds are formed between the reactive moieties present in the resin-based adhesive and the chemically-reactive functional groups on the bondable surface of the composite substrate, which are derived from the surface treatment layer (resin-rich peel ply/surface resin film). As a result, the covalently bonded structure has essentially no adhesive-composite interface. The presence of the chemically-active functional groups on the bondable surface described herein optimizes the subsequent bonding process by increasing the bond strength between the bonded substrates and improving bonding reliability. Furthermore, the covalently bonded structure is more resistant to contamination than bonded structures prepared by conventional co-bonding or secondary bonding processes.

The terms "cure" and "curing" as used herein encompass polymerizing and/or cross-linking of a polymeric material brought about by mixing of based components, heating at elevated temperatures, exposure to ultraviolet light and radiation. "Fully cured" as used herein refers to 100% degree of cure. "Partially cured" as used herein refers to less than 100% degree of cure.

The degree of cure of the partially cured surface treatment layer after co-curing with the composite substrate may be within the range of 10%-75% of full cure, e.g. 25%-75% or 25%-50%. The partially cured surface treatment layer (peel ply/resin film) contains unreacted/noncrosslinked functional groups, which is the source of chemically-active functional groups for the bondable surface. The degree of cure of a thermoset resin system can be determined by Differential Scanning calorimetry (DSC). A thermoset resin system undergoes an irreversible chemical reaction during curing. As the components in the resin system cure, heat is evolved by the resin, which is monitored by the DSC instrument. The heat of cure may be used to determine the percent cure of the resin material. As an example, the following simple calculation can provide this information:

% Cure=$[\Delta H_{uncured} - \Delta H_{cured}]/[\Delta H_{uncured}] \times 100\%$ In the embodiments involving peel ply, the peel ply has a resin content of at least 20% by weight based on the total weight of the peel ply, depending on the specific type of fabric being impregnated. In certain embodiments, the resin content is within the range of about 20% to about 80% by weight, or about 20% to about 50% by weight. The fabric may be composed of glass, nylon, or polyester fibers, although other types of fabrics are contemplated herein. In one embodiment, the resin-rich peel ply of the present disclosure contains, in weight percentages based on the total weight of the peel ply: about 20% to about 80% of thermosetting matrix resin, about 2% to about 20% curing agent(s), and about 5% to about 40% of additional modifiers or filler additives.

In the embodiments described herein, the resin component of the surface treatment layer and that of the composite substrate are formed from curable resin compositions which include: one or more thermoset resins; at least one curing agent; and optionally, additives, modifiers, and fillers. The matrix resin of the composite substrate may also include a minor amount of thermoplastic materials, such as polyamide and polyethersulfone, as tougheners.

Examples of suitable thermoset resins include, but are not limited to, epoxies, phenolics, cyanate esters, polyimides, bismaleimides, polyesters, polyurethane, benzoxazines (including polybenzoxazines), combinations thereof and precursors thereof.

Particularly suitable are multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)-methane), fluorine 4,4'-dihydroxy benzophenone, bisphenol Z (4,4'-cyclohexylidene-bisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resins) available from Dow Chemical Co.; triglycidyl ethers of aminophenol, e.g. ARALDITE® MY 0510, MY 0500, MY 0600, MY 0610 from Huntsman Corp. Additional examples include phenol-based novolac epoxy resins, commercially available as DEN 428, DEN 431, DEN 438, DEN 439, and DEN 485 from Dow Chemical Co.; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX®556, and TACTIX®756 from Huntsman Corp.

According to one embodiment, curing agents (or curatives) of the surface treatment layer are preferentially selected to allow for a slower cure rate than that of the composite substrate's matrix resin. The curatives may be selected from well-known curatives with reactivities that are well established. For instance, curatives for epoxy resins in order of increasing curing rate are generally classified as: polymercaptan<polyamide<aliphatic polyamine<aromatic polyamine derivatives<tertiary amine boron trifluoride complex<acid anhydride<imidazole<aromatic polyamine<cyanoguanadine<phenol novolac. This list is only a guide and overlap within classifications exists. Curatives of the surface treatment layer are generally selected from groups that are listed towards the higher end of the reaction order, whereas the composite substrate's curatives may be generally selected from groups towards the beginning of the reaction order.

Specific examples of curatives that may be used for the surface treatment layer and the composite substrate include, but are not limited to, melamine and substituted melamine derivatives, aliphatic and aromatic primary amines, aliphatic and aromatic tertiary amines, boron trifluoride complexes, guanidines, dicyandiamide, bisureas (including 2,4-Toluene bis-(dimethyl urea), commercially available as CA 150 from CVC Thermoset Specialties), 4,4'-Methylene bis-(phenyl dimethylurea), e.g. CA 152 from CVC Thermoset Specialties), and 4,4'-diaminodiphenylsulfone (4,4-DDS). One or more curing agents may be combined.

Table 1 provides some examples of curative pairing for epoxy-based composite substrate (e.g. prepreg) and epoxy-based surface treatment layer to achieve different curing rates.

TABLE 1

| Substrate (or Prepreg) Curative | Surface Treatment Curative |
|---|---|
| 1,3-bis(4-aminophenoxy)benzene | 4,4'-diaminodiphenylsulfone |
| 4,4'-diaminodiphenylsulfone | melamine |
| 4,4'-diaminodiphenylsulfone, dicyanoguanadine | 4,4-'diaminodiphenylsulfone |
| 4,4'-diaminodiphenylsulfone, dicyanoguanadine | melamine |
| 3,3'-diaminodiphenylsulfone | melamine |
| 1,3-bis(4-aminophenoxy)benzene | (3-(4-aminobenzoyl)oxyphenyl)-4-aminobenzoate |
| 3,3'-diaminodiphenylsulfone | 4,4'-diaminodiphenylsulfone |
| Bis-aniline M | 4,4'-diaminodiphenylsulfone |
| 4,4'-diaminodiphenylsulfone | (3-(4-aminobenzoyl)oxyphenyl)-4-aminobenzoate |
| Bis-aniline P | 3,3'-diaminodiphenylsulfone |
| 3,3'-diaminodiphenylsulfone, isophthalic dihydrazide | melamine |

According to another embodiment, the thermoset resin composition of the surface treatment layer contains one or more cure inhibitors that are able to slow the rate of reaction between the thermoset resins and curatives. Thus, the surface treatment layer may contain the same thermoset resins and curatives as those in the composite substrate, but will cure at a slower rate due to the presence of the inhibitors. For the purposes of the present disclosure, any inhibitor which slows the rate of reaction between the thermoset resin and the curative may be used.

For epoxy-based compositions, examples of suitable cure inhibitors include, but are not limited to, boric acid, trifluoroborane, and derivatives thereof such as alkyl borate, alkyl borane, trimethoxyboroxine and organic acids having a pKa from 1 to 3 such as maleic acid, salicyclic acid, oxalic acid and mixtures thereof. Other inhibitors include metal oxides, metal hydroxides, and alkoxides of metal, where the metal is zinc, tin, titanium, cobalt, manganese, iron, silicon, boron, or aluminum. When such inhibitor is used, the amount of inhibitor may be up to about 15 parts per hundred parts of resin or PHR, for example, about 1 to about 5 PHR, in a resin composition. "PHR" is based on the total weight of all resins in the resin composition.

In another embodiment, the composite substrate's matrix resin may contain one or more additives, accelerators, or catalysts that function to increase the rate of reaction between the thermoset resin and the curative therein.

Catalysts useful for the purposes disclosed herein are those catalysts which catalyze the reaction of a thermoset resin with a curing agent. For epoxy resins, examples of suitable catalysts are compounds containing amine, phosphine, heterocyclic nitrogen, ammonium, phosphonium, arsenium or sulfonium moieties. Suitable catalysts are heterocyclic nitrogen-containing and amine-containing compounds. Suitable heterocyclic nitrogen-containing and amine-containing compounds which may be used herein include, for example, imidazoles, imidazolidines, imidazolines, benzimidazoles, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, combinations thereof and the like. When such catalysts are used, the amount of catalyst(s) may be up to 15 parts per hundred parts of resin or PHR, for example, about 1 to about 5 PHR, in a resin composition.

Inorganic fillers in particulate form (e.g. powder) may also be added to the resin composition of the surface treatment layer/composite substrate as a rheology modifying component to control the flow of the resin composition and to prevent agglomeration therein. Suitable inorganic fillers include, but are not limited to, fumed silica, talc, mica, calcium carbonate, alumina, ground or precipitated chalks, quartz powder, zinc oxide, calcium oxide, and titanium dioxide. If present, the amount of fillers in the resin composition may be from about 0.5% to about 40% by weight, or about 1 to about 10% by weight, or about 1 to about 5% by weight, based on the total weight of the resin composition.

In the embodiments that use resin-rich peel ply for surface treatment, the peel ply may be formed by coating the resin composition onto the woven fabric so as to completely impregnate the yarns in the fabric using conventional solvent or hot-melt coating processes. The wet peel ply is then allowed to dry to reduce the volatile content, preferably, to less than 2% by weight. Drying may be done by air drying at room temperature overnight followed by oven drying at about 140° F. to about 170° F., or by oven drying at elevated temperature as necessary to reduce the drying time. Subsequently, the dried peel ply may be protected by applying removable release papers or synthetic films (e.g. polyester films) on opposite sides. Such release papers or synthetic films are to be removed prior to using the peel ply for surface treatment.

In the embodiments that use surface resin film for surface treatment, the resin film may be formed by coating a resin composition onto a removable carrier, e.g. release paper, using conventional film coating processes. The wet resin film is then allowed to dry. Subsequently, the resin film is placed onto a surface of a composite substrate, and the carrier is removed.

Composite Substrates

Composite substrates in this context refer to fiber-reinforced resin composites, including prepregs or prepreg layups (such as those used for making aerospace composite structures). The term "prepreg" as used herein refers to a layer of fibrous material (e.g. unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or continuous unidirectional fibers. "Unidirectional fibers" as used herein refers to a layer of reinforcement fibers that are aligned in the same direction. The term "prepreg layup" as used herein refers to a plurality of prepreg plies that have been laid up in a stacking arrangement. As example, the number of prepreg plies may be 2 to 100 plies, or 10 to 50 plies.

The layup of prepreg plies may be done manually or by an automated process such as Automated Tape Laying (ATL). The prepreg plies within the layup may be positioned in a selected orientation with respect to one another. For example, prepreg layups may comprise prepreg plies having unidirectional fiber architectures, with the fibers oriented at a selected angle $\theta$, e.g. 0°, 45°, or 90°, with respect to the largest dimension of the layup, such as the length. It should be further understood that, in certain embodiments, the prepregs may have any combination of fiber architectures, such as unidirectionally aligned fibers, multi-directional fibers, and woven fabrics.

Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable or uncured state prior to bonding. Impregnation may be facilitated by the application of heat and/or pressure.

As an example, the impregnating method may include:
(1) Continuously moving a layer of fibers (e.g., in the form of unidirectional fibers or a fabric web) through a (heated) bath of molten impregnating matrix resin composition to fully or substantially fully wet out the fibers; or
(2) Pressing top and bottom resin films against a layer of fibers (e.g., in the form of continuous, unidirectional fibers arranged in parallel or a fabric ply).

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof.

For the fabrication of high-strength composite materials, such as those for aerospace and automative applications, it is preferred that the reinforcing fibers have a tensile strength of greater than 3500 MPa.

Generally, the matrix resin of the composite substrates/prepregs is similar to that of the surface treatment layer as described above.

Adhesive

The adhesive for bonding composite substrates is a curable composition suitable for co-curing with uncured or curable composite substrates. The curable adhesive composition may comprise one or more thermoset resins, curing agent(s) and/or catalyst(s), and optionally, toughening agents, fillers, flow control agents, dyes, etc. The thermoset resins include, but are not limited to, epoxy, unsaturated polyester resin, bismaleimide, polyimide, cyanate ester, phenolic, etc.

The epoxy resins that may be used for the curable adhesive composition include multifunctional epoxy resins having a plurality of epoxy groups per molecule, such as those disclosed for the matrix resin of the peel ply and composite substrate.

The curing agents may include, for example, guanidines (including substituted guanidines), ureas (including substituted ureas), melamine resins, guanamine, amines (including primary and secondary amines, aliphatic and aromatic amines), amides, anhydrides, and mixtures thereof. Particularly suitable are latent amine-based curing agents, which can be activated at a temperature greater than 160° F. (71° C.), or greater than 200° F., e.g. 350° F. Examples of suitable latent amine-based curing agents include dicyandiamide (DICY), guanamine, guanidine, aminoguanidine, and derivatives thereof. A particularly suitable latent amine-based curing agent is dicyandiamide (DICY).

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis (dimethyl urea). As an example, dicyandiamide may be used in combination with a substituted bisurea as a curing accelerator.

Toughening agents may include thermoplastic or elastomeric polymers, and polymeric particles such as core-shell rubber (CSR) particles. Suitable thermoplastic polymers include polyarylsulphones with or without reactive functional groups. An example of polyarylsulphone with functional groups include, e.g. polyethersulfone-polyetherethersulfone (PES-PEES) copolymer with terminal amine functional groups. Suitable elastomeric polymers include carboxyl-terminated butadiene nitrile polymer (CTBN) and amine-terminated butadiene acrylonitrile (ATBN) elastomer. Examples of CSR particles include those commercially available under the trademark Kane Ace®, such as MX 120, MX 125, and MX 156 (all containing 25 wt. % CSR particles dispersed in liquid Bisphenol A epoxy).

Inorganic fillers may be in particulate form, e.g. powder, flakes, and may be selected from fumed silica quartz powder, alumina, mica, talc and clay (e.g., kaolin).

EXAMPLES

The following Examples are provided to illustrate certain aspects of the present disclosure.

Example 1

This example demonstrates the effectiveness of a surface treatment based on the concept of controlled curing kinetics.

A surface treatment film was formed by preparing a resin formulation containing, in parts by weight: 50 parts Dicyclopentadiene-containing novolac epoxy resin; 80 parts diglycidyl ether of bis-phenol A; 10 parts para-amino phenol epoxy resin; 10 parts poly(ether)sulfone; 39 parts 4,4'-diaminodiphenylsulfone; and 2 parts fumed silica.

The resin mixture was mixed using a hot-melt process followed by coating the resin mixture as an unsupported film at 0.054 psf (pounds per square foot). The resin film was manually laid up with 10 plies of prepreg material such that the resin film is the topmost layer. The prepreg material was composed of glass fibers impregnated with an epoxy-based matrix resin containing elastomer modified bis-A epoxy resins, novolac modified epoxy resin, dicyanoguanadine, and 1,1'-4(methyl-m-phenylene)bis(3,3'-dimethylurea). The uncured laminate with the resin film was then cured by heating at 250° F. for 3 hours at 80 psi. After cure, the cured composite was provided with a bondable surface. The cured composite laminate was removed from the tool and joined with another similarly prepared, cured composite laminate, which was subjected to the same surface treatment. No adhesive was used for the bonding step and only the surface treatment functional groups were available for bonding. The joined article was then heated at 350° F. for 90 min. at 80 psi.

Example 2

The following example shows the effect of a surface treatment that does not contain a slow cure surface treatment film for comparison.

A surface treatment film was formed by preparing a resin formulation containing, in parts by weight: 50 parts Dicyclopentadiene-containing novolac epoxy resin; 80 parts diglycidyl ether of bis-phenol A; 10 parts para-amino phenol epoxy resin; 10 parts poly(ether)sulfone; 29 parts 4,4'-diaminodiphenylsulfone; 2 parts dicyandiamide; and 2 parts fumed silica.

The resin mixture was mixed using a hot-melt process followed by coating the resin mixture as an unsupported film at 0.054 psf. The resin film was manually laid up with 10 plies of prepreg material such that the resin film is the topmost layer. The prepreg material was the same as that described in Example 1. The uncured laminate was then cured by heating at 250° F. for 3 hours at 80 psi. After cure, the cured composite was provided with a bondable surface. The cured composite was removed from the tool and joined with another similarly prepared, cured composite laminate, which contained the same bondable surface. No adhesive was used for the bonding step and only the surface treatment functional groups were available for bonding. The joined article was then heated at 350° F. for 90 min. at 80 psi.

Example 3

The following example demonstrates a surface treatment which involved the use of a removable peel ply to improve surface roughness and facilitate bonding.

A surface treatment layer was formed by preparing a resin formulation containing, in parts by weight: 50 parts Dicyclopentadiene-containing novolac epoxy resin; 80 parts diglycidyl ether of bis-phenol A; 10 parts para-amino phenol epoxy resin; 10 parts poly(ether)sulfone; 19 parts 4,4'-diaminodiphenylsulfone; and 2 parts fumed silica.

The resin mixture was mixed using a hot-melt process followed by coating the resin mixture onto a polyester-based fabric from Porcher Industries (Porcher 8115) to impregnate the fabric, and allowing the resin-impregnated fabric to dry, thereby forming a peel ply. The peel ply was manually laid up with 10 plies of prepreg material such that the peel ply is the topmost layer. The prepreg material is composed of carbon fibers impregnated with an epoxy-based matrix resin containing a tetra-functional epoxy resin based on methylene dianiline, a trifunctional epoxy resin based on meta-aminophenol, polyether sulfone, 3,3'-diaminodiphenylsulfone, and isophthalic dihydrazide (an accelerator). The uncured composite laminate was then cured by heating at 350° F. for 3 hours at 80 psi. After cure, the cured composite was removed from the tool, the peel ply removed, and adhesively joined with another similarly prepared, cured composite laminate, which was subjected to the same surface treatment with the peel ply. The adhesive used was FM 309-1 (available from Cytec Engineered Materials). The joined article was then heated at 350° F. for 90 min. at 40 psi to achieve cure.

Mechanical Properties of Bonded Structures and Characterization

The mechanical performance of the bonded structures produced in Examples 1-3 was determined by a $G_{1c}$ fracture toughness test done in accordance to ASTM D5528. The $G_{1c}$ results are shown in TABLE 2.

TABLE 2

| Fracture Toughness | Example 1 | Example 2 | Example 3 |
|---|---|---|---|
| $G_{1c}$ (Joules/m$^2$) | 1802 | 116 | 1211 |

TABLE 2 shows the advantages of the surface treatment of the present disclosure by demonstrating that improved bond strength was achieved compared to a surface treatment in which the curative caused full cure of the surface treatment resin.

Thermal Characterization

Figure 4:
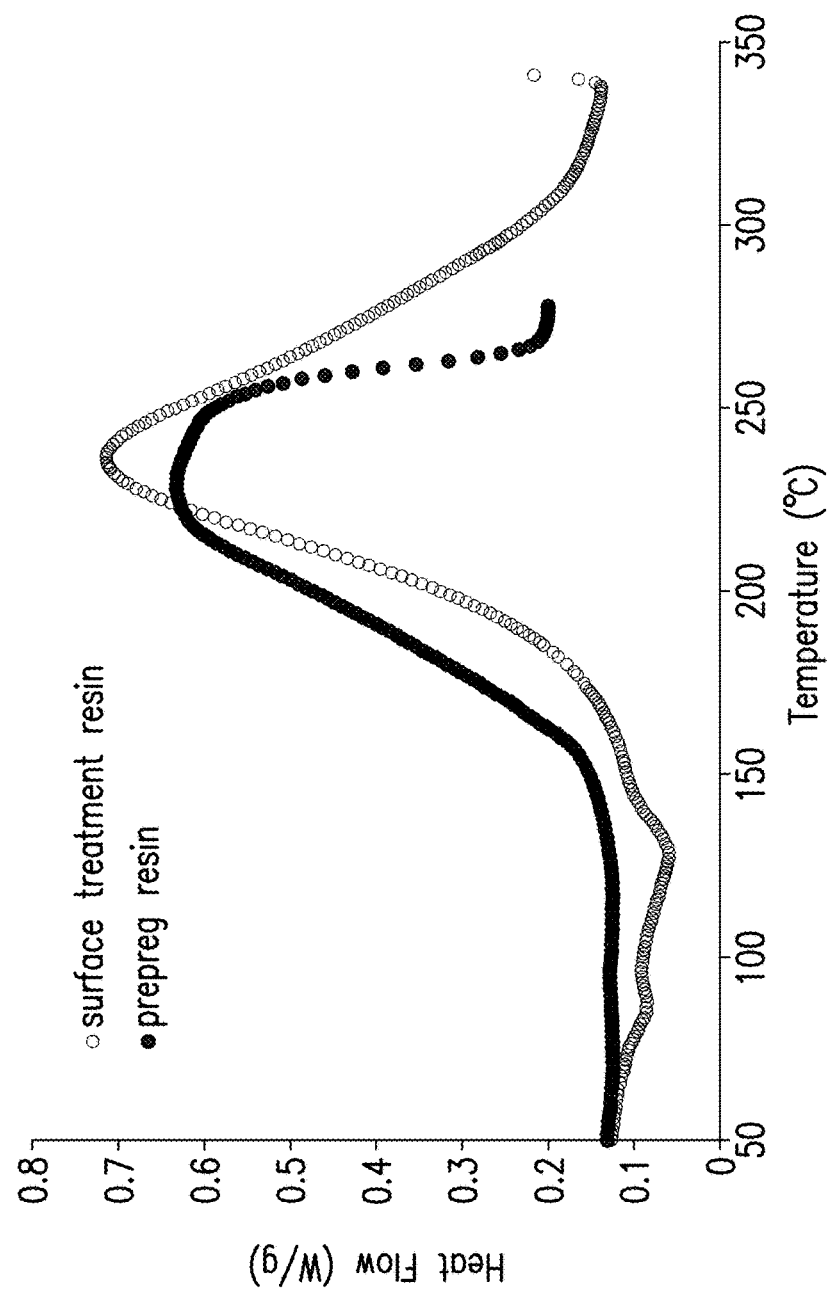
FIG. 4 is the trace for a DSC measurement of a surface treatment resin according to one embodiment versus a standard prepreg resin.

The rate of cure of the surface treatment layer compared to the rate of cure of an underlying prepreg material can easily be assessed by differential scanning calorimetry (DSC). FIG. 4 shows the DSC profile for the prepreg material and the surface treatment layer disclosed in Example 3. As can be seen from FIG. 4, the onset cure temperature of the surface treatment resin is higher than that of the prepreg resin. In this particular example, the prepreg material began to undergo cure and consumption of reactive epoxy functional groups at a rate that was higher than that of the surface treatment layer. Thus, following full curing of the prepreg material, the surface treatment resin was in a partially cured stated and contained unreacted functional groups.

What is claimed is:

1. A method for surface preparation prior to adhesive bonding comprising:
   (a) providing a composite substrate comprising reinforcing fibers impregnated with a first curable matrix resin;
   (b) applying a surface treatment layer onto a surface of the composite substrate, said surface treatment layer comprising a woven fabric infused with a second curable matrix resin different from the first matrix resin, wherein the second matrix resin is formulated to cure at a slower rate than the first matrix resin;
   (c) co-curing the composite substrate and the surface treatment layer until the composite substrate is fully cured but the surface treatment layer remains partially cured; and
   (d) removing the surface treatment layer from the composite substrate's surface, leaving a thin film of partially cured matrix resin on the composite substrate's surface, said thin film providing a roughened, bondable surface with chemically-active functional groups.

2. The method of claim 1, wherein the first and second curable matrix resins comprise one or more multifunctional epoxy resins.

3. The method of claim 1, wherein the first and second matrix resins comprise different curing agents that are selected to affect curing at different rates.

4. The method of claim 3, wherein
   the first and second matrix resins comprise one or more epoxy resins,
   the curing agents for the first and second matrix resins are selected from the group consisting of: melamine and substituted melamine derivatives, polymercaptan, polyamide, aliphatic polyamine, aromatic polyamine derivatives, tertiary amine boron trifluoride complex, acid anhydride, imidazoles, aromatic polyamine, cyanoguanadine, phenol novolac, and
   the curing agents for the first and second curable matrix resin are selected to enable the first matrix resin to cure at a faster rate relative to that of the second matrix resin.

5. The method of claim 4, wherein the first matrix resin comprises 1,3-bis(4-aminophenoxy)benzene, and the second matrix resin comprises 4,4'-diaminodiphenylsulfone or (3-(4-aminobenzoyl)oxyphenyl)-4-aminobenzoate, as curing agents.

6. The method of claim 4, wherein the first matrix resin comprises 4,4'-diaminodiphenylsulfone or 3,3'-diaminodiphenylsulfone, and the second matrix resin comprises melamine, as curing agents.

7. The method of claim 4, wherein the first matrix resin comprises the combination of 4,4'-diaminodiphenylsulfone and dicyanoguanadine, and the second matrix resin comprises 4,4'-diaminodiphenylsulfone or melamine, as curing agents.

8. The method of claim 4, wherein the first matrix resin comprises 3,3'-diaminodiphenylsulfone, and the second matrix resin comprises 4,4'-diaminodiphenylsulfone, as curing agents.

9. The method of claim 4, wherein the first matrix resin comprises Bis-aniline M, and the second matrix resin comprises 4,4'-diaminodiphenylsulfone, as curing agents.

10. The method of claim 4, wherein the first matrix resin comprises 4,4'-diaminodiphenylsulfone, and the second matrix resin comprises (3-(4-aminobenzoyl) oxyphenyl)-4-aminobenzoate, as curing agents.

11. The method of claim 4, wherein the first matrix resin comprises Bis-aniline P, and the second matrix resin comprises 3,3'-diaminodiphenylsulfone, as curing agents.

12. The method of claim 4, wherein the first matrix resin comprises the combination of 3,3'-diaminodiphenylsulfone and isophthalic dihydrazide, and the second matrix resin comprises melamine, as curing agents.

13. The method of claim 1, wherein the second curable matrix resin comprises one or more thermoset resins, a curing agent, and an inhibitor which can slow the rate of reaction between the one or more thermoset resins and the curing agent in the second matrix resin.

14. The method of claim 13, wherein said inhibitor is selected from the group consisting of: boric acid; trifluoroborane; alkyl borate; alkyl borane; trimethoxyboroxine; organic acids having a pKa from 1 to 3, including maleic acid, salicyclic acid, oxalic acid; metal oxides, metal hydroxides, and alkoxides of metal, where the metal is selected from: zinc, tin, titanium, cobalt, manganese, iron, silicon, boron, or aluminum; and combinations thereof.

15. The method of claim 1, wherein the first curable matrix resin comprises one or more thermoset resins, a curing agent, and an accelerator which can increase the rate of reaction between the one or more thermoset resins and the curing agent.

16. The method of claim 15, wherein the first matrix resin comprises one or more epoxy resins and the accelerator is selected from compounds containing amine, phosphine, heterocyclic nitrogen, ammonium, phosphonium, arsenium or sulfonium moieties.

17. The method of claim 15, wherein the first matrix resin comprises one or more epoxy resins and the accelerator is selected from the group consisting of: benzimidazoles, imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, and combinations thereof.

18. A bonding method comprising:
(a) providing a first composite substrate comprising reinforcing fibers impregnated with a first curable matrix resin;
(b) applying a removable, resin-rich peel ply onto a surface of the first composite substrate, said peel ply comprising a woven fabric infused or impregnated with a second curable matrix resin, which is formulated to cure at a slower rate than the first curable matrix resin;
(c) co-curing the first composite substrate and the peel ply until the first composite substrate is fully cured but the second matrix resin in the peel ply remains partially cured;
(d) removing the peel ply from the first composite substrate's surface, leaving a thin film of partially cured second matrix resin on the first composite substrate's surface, said thin film providing a roughened, bondable surface with chemically-active functional groups;
(e) joining the cured, first composite substrate to a second composite substrate with a curable adhesive film in between the composite substrates,
wherein the curable adhesive film comprises chemically-active functional groups capable of reacting with the chemically-active functional groups on the bondable surface of the first composite substrate; and
(f) curing the adhesive film to form a covalently bonded structure.

19. The bonding method of claim 18, wherein the second composite substrate is cured prior to being joined to the cured, first composite substrate.

20. The bonding method according to claim 18, wherein the second composite substrate is uncured or partially cured prior to being joined to the first composite substrate, and during curing at (f), the adhesive film and the second composite substrate are cured simultaneously.

21. The bonding method of claim 18, wherein the first and second curable matrix resins comprise different curing agents that are selected to affect curing at different rates.

* * * * *